Sept. 8, 1931.    R. E. DAVIS    1,822,132
ANTISKID CALK FOR TRACTOR BELTS
Filed March 7, 1930

Inventor
Ralph E. Davis,

By Emery, Booth, Varney & Holcombe
Attorney

Patented Sept. 8, 1931

1,822,132

UNITED STATES PATENT OFFICE

RALPH E. DAVIS, OF BAKER, OREGON

ANTISKID CALK FOR TRACTOR BELTS

Application filed March 7, 1930. Serial No. 433,998.

This invention relates to auxiliary anti-skid lugs or calks adapted to be attached to the links which make up the traction belts on tractors of the track laying type, to afford a better and satisfactory traction for such tractors upon icy surfaces and the invention aims generally to improve such devices.

Figure 1:
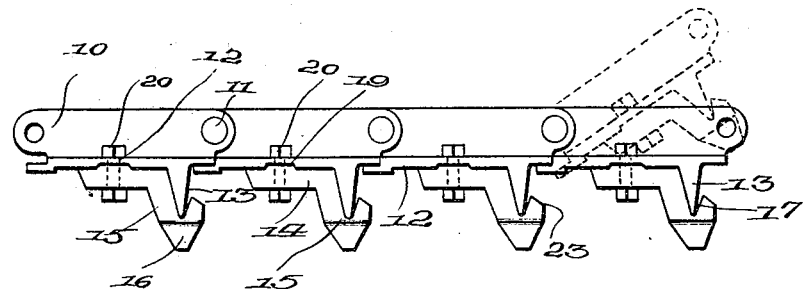
Figure 2:
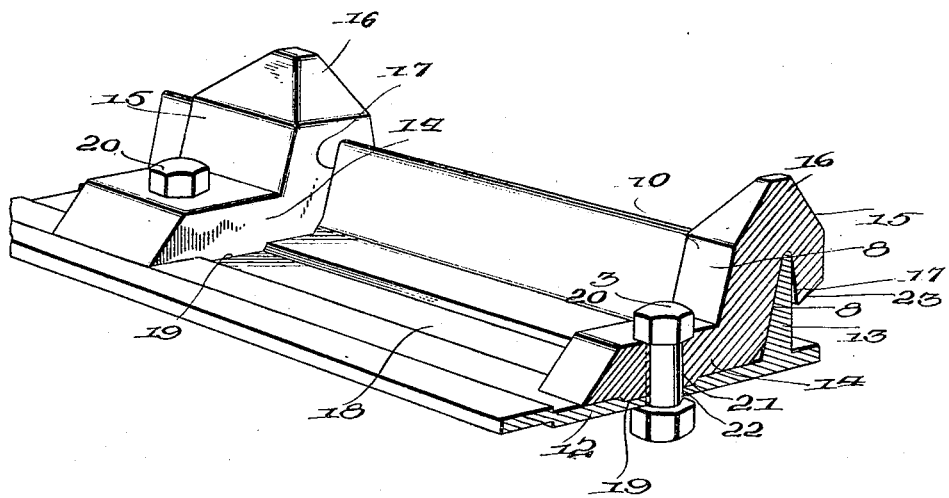

Illustrative of the invention, one embodiment thereof is shown in the accompanying drawings, wherein Fig. 1 is a side elevation of a series of links of a tractor belt with my improved anti-skid lugs applied thereto; and Fig. 2 is an enlarged perspective of a link with two of the lugs applied thereto, one of the lugs being shown in section to show more clearly the securing means.

Referring to the illustrative embodiment of the invention shown in the drawings, the traction belt for tractors, particularly of the track laying type, consists of a plurality of links 10 pivotally connected together as at 11, and trained over sprockets or other suitable driving members as to continuously lay a track upon which the tractor may travel. These links 10 are of a variety of shapes and construction but generally include a horizontal bottom plate 12 and a projecting flange or rib 13 adapted to bite into the earth as the track is progressively laid.

The presence of the flanges or ribs 13, while satisfactory to provide a non-skid traction for use in loose soil and the like, is inadequate to prevent skidding when a tractor is used on hard icy surfaces, in which case these flanges or ribs act as runners and permit side skidding of the tractor on the ice.

According to my invention supplementary anti-skid calks or lugs are applied to the links, preferably projecting beyond the outer edge of the ribs 13 and preferably present tapered or pyramidal engaging surfaces adapted to penetrate a hard icy surface and prevent side skidding of the tractor.

One simplified embodiment of the invention as shown consists in shaping the calk of substantially heavy metal providing a base portion 14 and an angularly projecting ice-engaging portion 15 terminating in a pyramidal end 16 adapted to bite into the ice and prevent side skidding of the tractor. The portion 15 is shaped to provide a groove 17 transversely thereof in which the flange or rib 13 of the traction link may be seated. Thus the ground-engaging portion 15 embraces the traction link so as to provide a more sturdy construction, the pyramidal or pointed end 16 being preferably axially disposed with reference to the plane of the rib 13.

In some commercial tractors the base portion 12 of the tractor link is formed with a channel 18 and advantageously the base portion 14 of the calks may be formed with an enlarged boss 19 to be received by the channel of the link so as to hold the lug or calk firmly against shifting. The calks may suitably be secured to the links by means of a bolt or other suitable fastening device 20, inserted through the opening 21 in the base 14 and an opening in the horizontal portion 12 of the link.

The forward side of the ground-engaging portion 15, opposite the base portion 14 of the calks, is cut away as at 23 to provide clearance for the adjacent link in its pivotal movement at the ends of the track as shown in Fig. 1. This permits of making the lugs or calks sufficiently strong in the region of the severest strain, and permits them to embrace the ribs 13 without interference with adjacent links.

From the above it is evident that my invention provides normal means for affording adequate traction for the tractor when operated upon slippery icy surfaces. The positioning of the pointed engaging surfaces 16 axially of the ribs of the tractor links permits of the use of the lugs under the severest service without damage to the ribs 13 and links. Furthermore the calks may be readily applied to the tractor when desired because the ribs 13, channels 18 and bolt holes are of standard construction of the ordinary link.

I claim:

In a track belt for track laying tractors, a non-skid tractor link having a bottom plate provided with a transversely extending angularly shaped channel therein said bottom plate having an aperture therethrough within said channel and an angularly extending transverse rib adjacent one end of the plate, a non-skid calk removably secured to said link comprising a base portion engaging said bottom plate having an angularly projecting ground-engaging portion having a notched portion embracing said rib and provided with a ground-engaging end substantially in alignment with said rib, and a single fastening element extending through said base portion and aperture of said bottom plate for securely fastening said connection to said link, said base portion being provided with a rectangular boss fitting in said channel and preventing tendency of said calk to pivot about said fastening element, whereby bending strains transmitted to said rib through said ground-engaging portions are minimized.

In testimony whereof, I have signed my name to this specification.

RALPH E. DAVIS.